Dec. 19, 1933.  S. G. DOWN  1,939,844

EMERGENCY VALVE MECHANISM

Filed April 3, 1929

INVENTOR
SIDNEY G. DOWN
BY *Wm. M. Cady*
ATTORNEY

Patented Dec. 19, 1933

1,939,844

UNITED STATES PATENT OFFICE 1,939,844

EMERGENCY VALVE MECHANISM

Sidney G. Down, Edgewood, Pa., assignor to The Westinghouse Air Brake Company, Wilmerding, Pa., a corporation of Pennsylvania Application April 3, 1929. Serial No. 352,153

5 Claims. (Cl. 303—33)

This invention relates to a quick action emergency valve mechanism, such as is employed in the well known triple valve device of a fluid pressure brake system.

The emergency valve mechanism as heretofore employed comprises an emergency piston working in a bushing secured in the triple valve body casing and having a hollow stem which is guided in a bearing in a member which is clamped between the triple valve casing and the check valve case. Said member is provided with a seat for an emergency valve, which valve has a stem which extends into the bore of the hollow piston stem.

The emergency valve is also provided with a downwardly extending stem which is guided in a bore of the emergency check valve.

Occasionally, due to improper or careless handling by a workman in disassembling the check valve case from the triple valve body, the stems of the emergency valve may become bent, so that when the parts are again assembled, the emergency piston and the emergency valve may be thrown out of alinement, so that the piston may bind and stick in the bushing and the emergency valve may fail to seat properly.

The principal object of my invention is to provide an emergency valve mechanism of the above character in which binding and sticking of the emergency piston will be prevented and the proper seating of the emergency valve will be assured.

Figure 1:
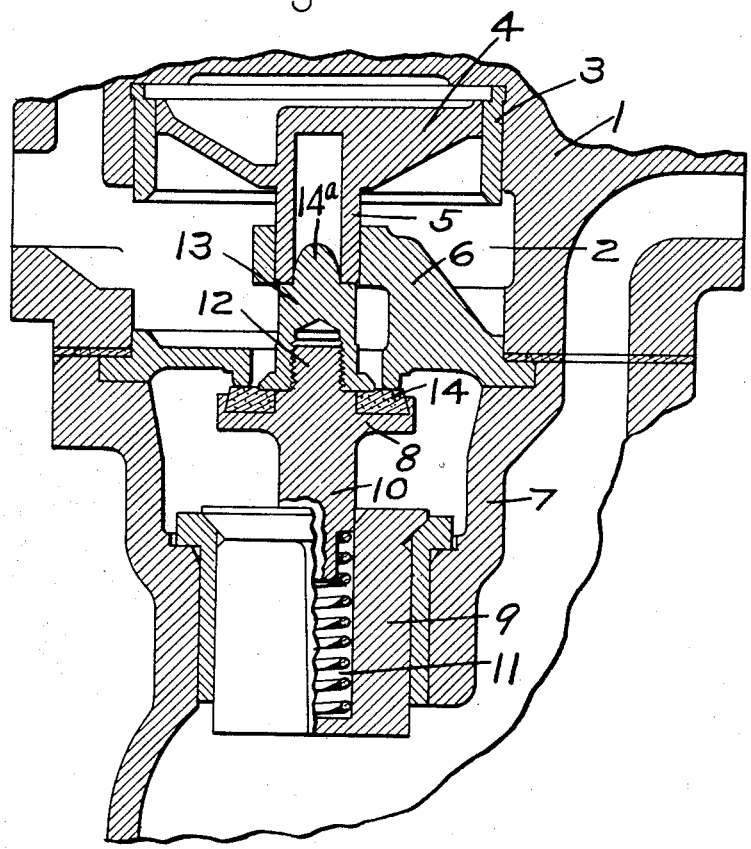

In the accompanying drawing; Figure 1 is a sectional view of the emergency valve portion of a triple valve device, showing my invention embodied therein; and Fig. 2 a fragmentary sectional view showing a slightly modified construction in accordance with my invention.

The construction shown in Fig. 1 comprises a triple valve body section 1 having a chamber 2 in which is mounted a bushing 3 and in said bushing, an emergency piston 4 is adapted to slide. Said piston is provided with a hollow stem 5 which is guided in a bore of a guide member 6.

The guide member 6 is clamped between the valve body 1 and an emergency check valve casing 7 and said member is provided with a seat for an emergency valve 8. Mounted in the casing 7 in alinement with the emergency valve 8 is an emergency check valve 9 and said emergency valve has a stem 10 which extends into a bore 11 of the emergency check valve.

On a threaded extension 12 of the emergency valve 8 is screwed a combined nut and stem member 13. The member 13 is adapted to clamp in position the resilient seat 14 of the emergency valve and also acts as a stem to engage the lower end of the hollow piston stem 5. The upper end of the stem 13 is provided with a rounded teat 14a which extends into the bore of the hollow piston stem 5.

The teat 14a serves to impositively maintain alinement between the stem 5 and the stem 13, but will permit of a rocking movement between the stems, so that the stem 13 will not exert a force on the stem 5 such as would tend to cause the piston 4 to bind or stick in its guide bushing 3, in case the stems should be out of alinement, and further, the emergency valve 8 will not be prevented from seating properly.

Figure 2:
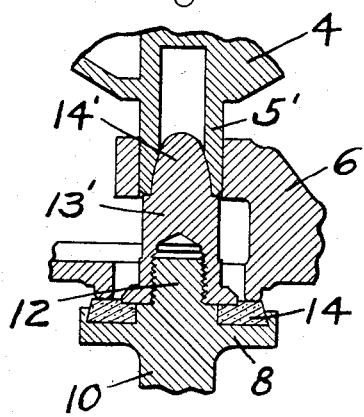

In the construction shown in Fig. 2, the teat 14' is formed with a surface generated by the rotation of an arc of a circle about the axis of the stem, the radius of the arc being equal to the diameter of the teat at its base.

The convex surface so formed engages a corresponding concave surface formed in the bore of the hollow stem 5, so that normally, large bearing surfaces of the stems engage to ensure alinement of the stems, while rocking of the stems is freely permitted.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an emergency valve mechanism for a fluid pressure brake controlling valve device, the combination with an emergency piston having a hollow stem, of an emergency valve, a stem carried by said valve and having a rounded extremity extending into the bore of said hollow stem to thereby provide a guiding means for the valve stem and also permit a relative cocking movement between said stems.

2. In an emergency valve mechanism for a fluid pressure brake controlling valve device, the combination with an emergency piston having a stem, of an emergency valve having a seat member and a combined nut and stem removably secured to said valve for clamping said seat member to the valve and having a rounded extremity for engagement with the end of said piston stem to permit of relative cocking movement between said stems.

3. In an emergency valve mechanism for a fluid pressure brake controlling valve device, the combination with an emergency piston having a stem, of an emergency valve having a seat member, and a nut having screw-threaded engagement with said valve for clamping said seat member to the valve, said nut having an integral stem portion having a rounded extremity adapted to engage the stem at the open end of a recess in the end of said piston stem for permitting relative cocking movement between said stems and for maintaining said valve centrally disposed relative to the valve opening.

4. In an emergency valve mechanism for a fluid pressure brake controlling valve device, the combination with an emergency piston having a hollow stem, of an emergency valve in axial alinement with said stem and having a seat member, a combined nut and stem carried by said valve and disposed in spaced relation to the valve opening, for clamping said seat member to said valve, and a rounded teat carried by said combined nut and stem and extending into the bore of said hollow piston stem and engaging the piston stem at the open end of the bore for maintaining said valve centrally disposed relative to said valve opening and for permitting relative cocking movement between said stems.

5. In an emergency valve mechanism for a fluid pressure brake controlling valve device, the combination with an emergency piston having a hollow stem, of an emergency valve in axial alinement with said stem and having a seat member, a threaded extension carried by said valve, a nut having screw-threaded engagement on said extension for clamping said seat member in place, and a stem integral with said nut and having a shoulder for engaging the end of said piston stem and a reduced portion extending into a bore in said piston stem and engaging said piston stem at the open end of the bore for maintaining said valve centrally disposed with respect to its valve opening and for permitting relative cocking movement between said stems.

SIDNEY G. DOWN.